United States Patent [19]
Monforte et al.

[11] Patent Number: 5,360,249
[45] Date of Patent: Nov. 1, 1994

[54] MULTIFUNCTIONAL END EFFECTORS

[75] Inventors: Mathew L. Monforte, Hamilton; Edward D. Dreyfus, Clark, both of N.J.

[73] Assignee: Refac Technology Development, Corporation, New York, N.Y.

[21] Appl. No.: 27,429

[22] Filed: Mar. 8, 1993

Related U.S. Application Data

[63] Continuation of Ser. No. 760,059, Sep. 13, 1991, abandoned.

[51] Int. Cl.$^5$ .............................................. B25J 15/04
[52] U.S. Cl. ................................. 294/119.1; 294/902; 294/86.4; 901/39
[58] Field of Search .................. 294/86.4, 119.1, 902, 294/907; 901/30, 31, 39, 41

[56] References Cited

U.S. PATENT DOCUMENTS

| | | | |
|---|---|---|---|
| 4,545,723 | 10/1985 | Clark | 901/31 X |
| 4,591,198 | 5/1986 | Monforte | 294/902 X |
| 4,601,637 | 7/1986 | Aviles et al. | 294/902 X |
| 4,613,277 | 9/1986 | Guay | 294/902 X |
| 4,624,043 | 11/1986 | Bennett | 901/37 X |
| 4,664,588 | 5/1987 | Newell et al. | 901/41 X |
| 4,676,142 | 6/1987 | McCormick | 294/86.4 X |
| 4,793,053 | 12/1988 | Zuccaro et al. | 294/86.4 X |
| 4,809,425 | 3/1989 | Monforte | 901/37 X |
| 4,815,780 | 3/1989 | Obrist | 294/86.4 |
| 4,944,629 | 7/1990 | Peveto | 901/30 X |
| 5,083,352 | 1/1992 | Nakako | 901/30 X |

FOREIGN PATENT DOCUMENTS 239756 10/1986 Germany .............................. 901/31

Primary Examiner—Dean J. Kramer
Attorney, Agent, or Firm—Sachs & Sachs

[57] ABSTRACT

A multifunctional end effector includes a quick release finger locking mechanism disposed in each of the pair of fingers which maintains system accuracy and integrity by providing a positive pressure force between the end effector finger and the mating locking plates provided on the tools adapted to cooperate with the end effector. In one embodiment the mating locking plate intrudes into the fingers of the end effector and an alternative embodiment the end effector finger engaging mechanisms grasp and lock on ledges provided on the cooperating mating locking plates.

7 Claims, 6 Drawing Sheets

MULTIFUNCTIONAL END EFFECTORS

The present application is a continuation of U.S. patent Ser. No. 07/760,059, filed Sep. 13, 1991, now abandoned.

BACKGROUND OF THE INVENTION

1. Field of the Invention

The invention relates to robotic end effectors, and more particularly, to end effector having a pair of gripping fingers which are suitable for engaging, retaining and releasing a plurality of tools and components, and has disposed therein a quick release locking mechanism.

2. Discussion of the Relevant Art

Automated production lines make the use of a plurality of robots to perform the numerous functions, such as inserting components, drilling, inserting screws and/or washers and moving components from one place to another and thereafter inserting them into particular printed circuit configurations or assemblies. With the variations in component size and the miniaturization of components it has become necessary to locate and insert these components with extreme accuracy so that a human being not be utilized during the production of the equipment. With the improved techniques introduced into the automated production line a single robotic arm is capable of performing many different functions by changing the tools acquired by the end effector disposed on the distal end of a robotic arm. Typical of these automatic production lines utilizing the concept of a robot having an arm capable of automatically changing tools affixed to the distal end of the robotic arm, generally referred to as an end effector, is disclosed in U.S. Pat. No. 4,809,425 issued on Mar. 7, 1989 to Mathew L. Monforte.

An end effector affixed on a robotic arm used in an automatic production line is described in detail in U.S. Pat. No. 4,591,198, issued on May 27, 1986 to Mathew L. Monforte and is incorporated herein in its entirety.

The automated production line utilizing multifunctional robots disclosed in these two patents overcome the shortcomings generally known to the art. The exchangeable end effector and cooperating tools utilized therein disclosed a simple, yet efficient means for acquiring and releasing tools and was a decided improvement over the known art.

U.S. Pat. No. 4,624,043 issued to David M. Bennett on Nov. 25, 1986 is another technique, commonly known as wrist change-out devices, utilized to acquire various types of tools and utilizes three translating devices disposed about the circumference of a circularly-shaped end effector which could acquire a limited number of tools, since the complete end effector is replaced and the wrist change-out member permanently mounted on the distal end of the robotic arm is not provided with fingers.

The disadvantages of wrist change-out devices include the requirement for a wrist plate to be mounted on every tool and/or end-effector to be acquired for operation on the robot. These plates add to the weight and length at the end of the robot arm which decreases the overall accuracy of the robot. Also, because of the size and thickness requirements of these plates, fitting them on new tools and end effectors usually requires much system engineering time and expense whenever production needs are initiated or changed. The length (thickness) and diameter of the wrist plate also takes up valuable real estate in the cell and tool storage bin and thereby limits the number of active and passive tools that can be nested for acquisition.

The flexible, multifunctional end effector and robotic cell disclosed in the '425 and '198 patents represent a breakthrough in automatic active and passive tool change-out devices by providing thin light-weight simple adapter plates with protrusions (keys) that fit through slots in the end effector fingers. Each gripper finger includes a locking assembly that engages the grooves of the inserted keys. The small light weight adapter keys can be easily mounted to any active or passive tool or finger shape for automatic acquisition by each of the gripper fingers to perform one of several designed robotic tasks.

This prior art was not free of problems. Tasks requiring high torque to be placed on the adapter keys, on occasion caused the top of the adapter plate to canter away from the finger surface. In some applications tool locking forces are insufficient for the designed tasks resulting from the small surface area of the locking piston on which the pneumatic drive forces are applied. Therefore, tool acquisition was not always as accurate and reliable as required.

Thus, the present invention overcomes shortcomings found in the prior art and provides advances over the prior art and includes a multifunctional end effector with two gripper fingers coupled to a drive assembly wherein each finger includes a quick lock/release mechanism that releasably acquires, with high precision and a mechanical advantage, a mating locking plate which becomes an integral part of each end effector finger. Another aspect of the invention includes mounting the lock/release mechanism including the drive mechanism therefor at the lower end of each end effector finger for better space utilization. A further aspect of the invention includes providing a substantial surface area for the lock/release mechanism drive so that the locking forces are sufficiently high to assure reliable acquisition integrity. In the instant invention, the mating locking plate surface is therefore compressed against the finger surface with great force, accuracy and integrity. Another aspect of the instant invention includes providing the mating locking plate with alignment elements to accurately align and fix the mating locking plate on the finger surface insuring the system's accuracy and integrity.

Therefore, it is an object of the present invention to provide an end effector having a pair of fingers, with a mechanism capable of quickly, accurately, reliably and firmly releasing and acquiring end effector active and passive tools.

It is another object of the present invention to provide an end effector which can, with great reliability, acquire and release an endless variety of tools and finger shapes for picking and placing any size and any shaped single or multiple part or parts.

Another object of the instant invention is to provide a multifunctional end effector in which each moveable finger thereof has a quick-release mechanism that cooperates with mating locking plates that easily mount on a desired tool or a plurality of tools.

Still another object of the invention is to standardize the robot/tool interface regardless of tool or part size or shape.

Yet another object of the invention is to enable the robot to be retooled or its cell functions to be re-engineered in hours instead of days.

It is yet another object of the present invention to provide an end effector mechanism having a pair of fingers with a locking and releasing mechanism on each finger capable of acquiring various types of tools.

It is still yet another object of the present invention to provide an end effector mechanism with a pair of fingers that may readily acquire two piece tools that are unsymmetrical.

It is still yet another object of the present invention to provide an end effector having a pair of fingers that may readily capture tools and is capable of providing electrical and pneumatic energy for the operation of the tools.

It is yet another object of the present invention to provide an end effector tool having a pair of fingers that incorporate sensing devices therein capable of providing a signal to the computer operating the associated robotic arm.

Other and further objects and advantages of the invention will become apparent with the following detailed description of exampled embodiments of the invention.

SUMMARY OF THE INVENTION

A multifunctional end effector having a quick release finger locking mechanism and a pair of extending fingers disposed on the distal end of a robotic arm, according to the principles of the present invention, include a first driving device disposed in said end effector that provides substantially parallel or linear movement for the pair of extending fingers. A second driving device is disposed on each of the fingers for activating, the respective quick release finger locking mechanism. The second drive device when activated to its locking position provides a force on an acquired mating locking plate releasably disposed on the end of an end effector tool in the direction of the fingers. The mating locking disposed on each of the extending fingers is adapted to cooperate with a mating locking plate disposed on a cooperating end effector tool.

The foregoing and other objects and advantages will appear from the description to follow. In the description, reference is made to the accompanying drawing which forms a part hereof, and in which is shown, by way of illustration, specific embodiments in which the invention may be practiced. These embodiments will be described in sufficient detail to enable those skilled in the art to practice the invention and it is to be understood that other embodiments may be utilized and that structural changes may be made without departing from the scope of the invention. The following detailed description is, therefore, not to be taken in a limiting sense, and the scope of the present invention is best defined by the appended claims.

Like reference characters have been utilized to designate like or corresponding components in the various views and embodiments in order to better understand the invention.

BRIEF DESCRIPTION OF THE DRAWING

In order that the invention may be more fully understood, it will now be described by way of example, with reference to the accompanying drawing in which.

DESCRIPTION OF THE PREFERRED EMBODIMENT

Figure 1:
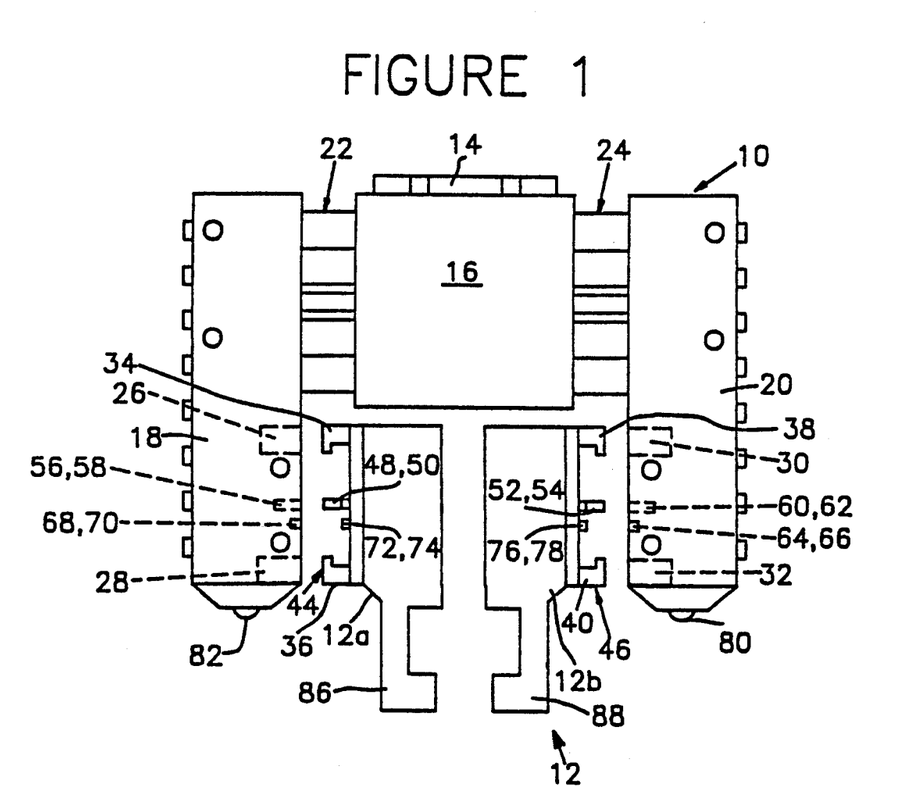
FIG. 1 is a front view in elevation of a robotic end effector, in its open or expanded position ready to acquire an end effector tool, according to the principles of the present invention.
Figure 2:
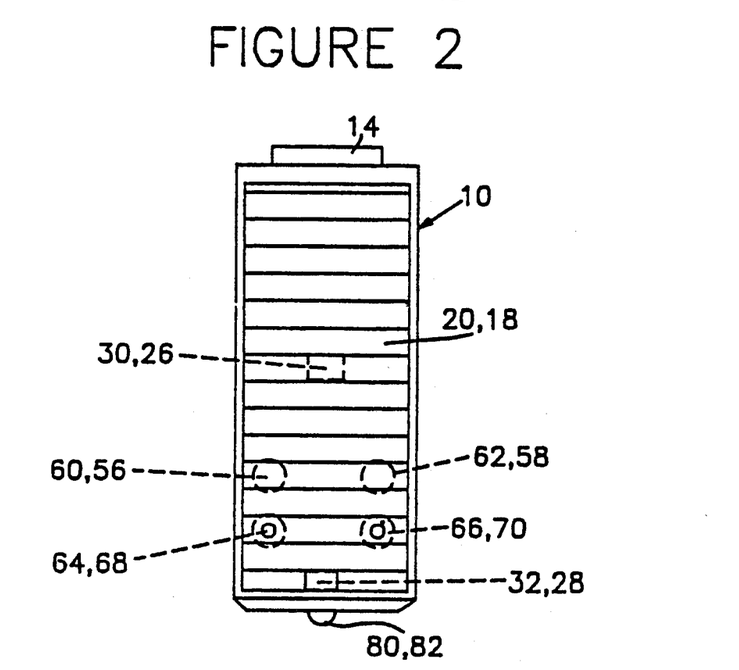
FIG. 2 is an end view in elevation of the robotic end effector shown in FIG. 1.

Referring now to the figures and in particular to FIGS. 1 and 2, there is shown an end effector 10, according to the principles of the present invention, in its open position placed directly above a replaceable end effector tool comprising tool members 12a and 12b. Each member includes a mating locking plate 44, 46 secured in any suitable manner to the tool sections 12a and 12b generally as shown. The end effector 10 is preferably of the type disclosed in U.S. Pat. No. 4,591,198 issued to M. L. Monforte on May 27, 1986, which may be affixed to a robotic arm, not shown, by means of mounting plate 14. The end effector 10 is provided with a central body portion 16 which houses the linear drive mechanism for a pair of fingers 18 and 20 coupled to the central body portion by linkages 22 and 24, respectively. One suitable example of such drive is Robohand Corp., Model RPW-375-1.

Figure 6:
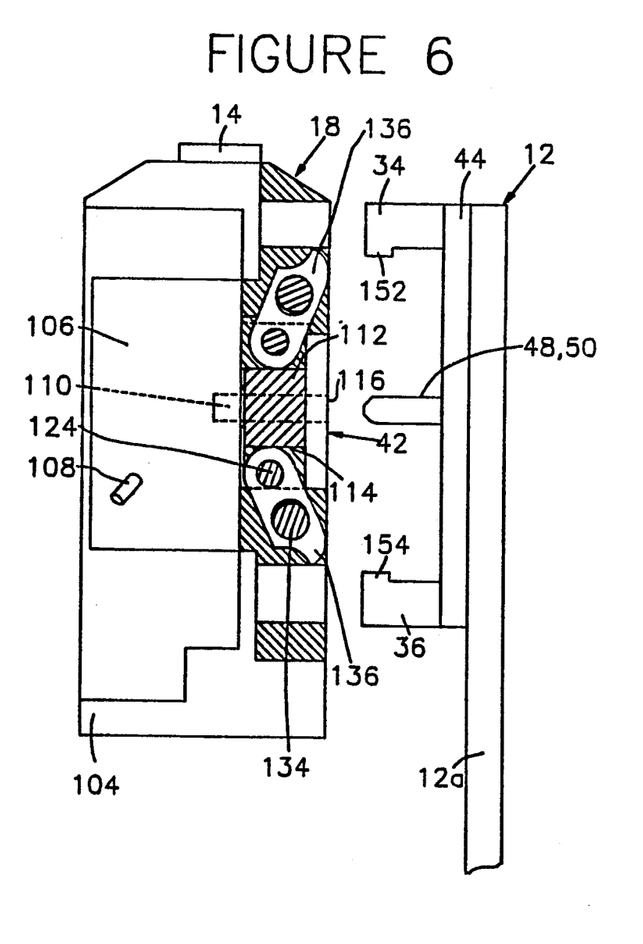
FIG. 6 is an enlarged front view in elevation, partially broken away, in position just before acquiring an end effector tool.
Figure 7:
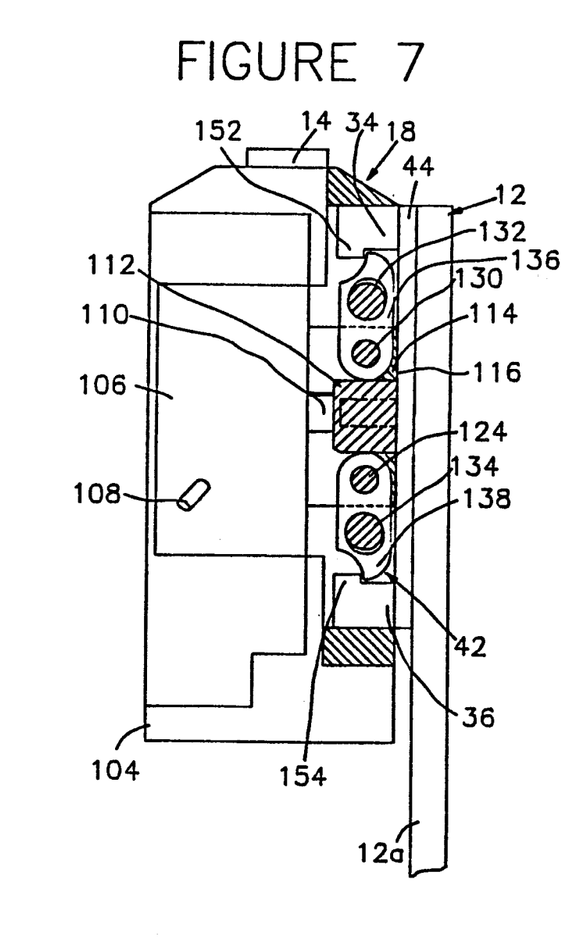
FIG. 7 is an enlarged view partially in cross-section of the left finger of a robotic end effector having just acquired a robotic tool.

Fingers 18 and 20 are also provided with rectangularly-shaped apertures 26, 28, 30 and 32 which are adapted to receive therein cooperating L-shaped protrusions 34, 36, 38 and 40 provided on the locking mating locking plate 44, 46 of robotic end effector tool 12 that will engage the locking mechanism as shown in FIGS. 6 and 7. Also included on the mating locking plates 44 and 46 of end effector tool 12 are tapered pins 48, 50, 52 and 54 provided on tool members 12a and 12b, respectively. The tapered pins 48 and 50 and 52 and 54 are adapted to guide with great accuracy the tool members 12a and 12b into apertures 56, 58 and 60, 62 provided on fingers 18 and 20, respectively. In addition, sockets 64, 66 and 68, 70 may be provided in the fingers 18 and 20, respectively, to cooperate with electrically conductive pins 72, 74 and 76 provided on the locking key portions 44 and 46 on tool members 12a and 12b, respectively. The sockets 64, 66, 68 and 70 may be wired to a conventional source of voltage A.C. or D.C., as required, to operate a particular tool such as, for example, a drill for putting holes in a member, not shown.

In addition, fingers 18 and 20 may be provided with proximity sensors 80 and 82 disposed on the distal surface of fingers 18 and 20 in order to provide information to the computer, which is driving the end effector 10, that it may be necessary to change the speed of the arm as it approaches a particular object. Although the locking mechanism is preferably located on the inside of the fingers 18 and 20, they could, of course, be located on the outside of the fingers without departing from the present invention.

Figures 3, 4, 5:
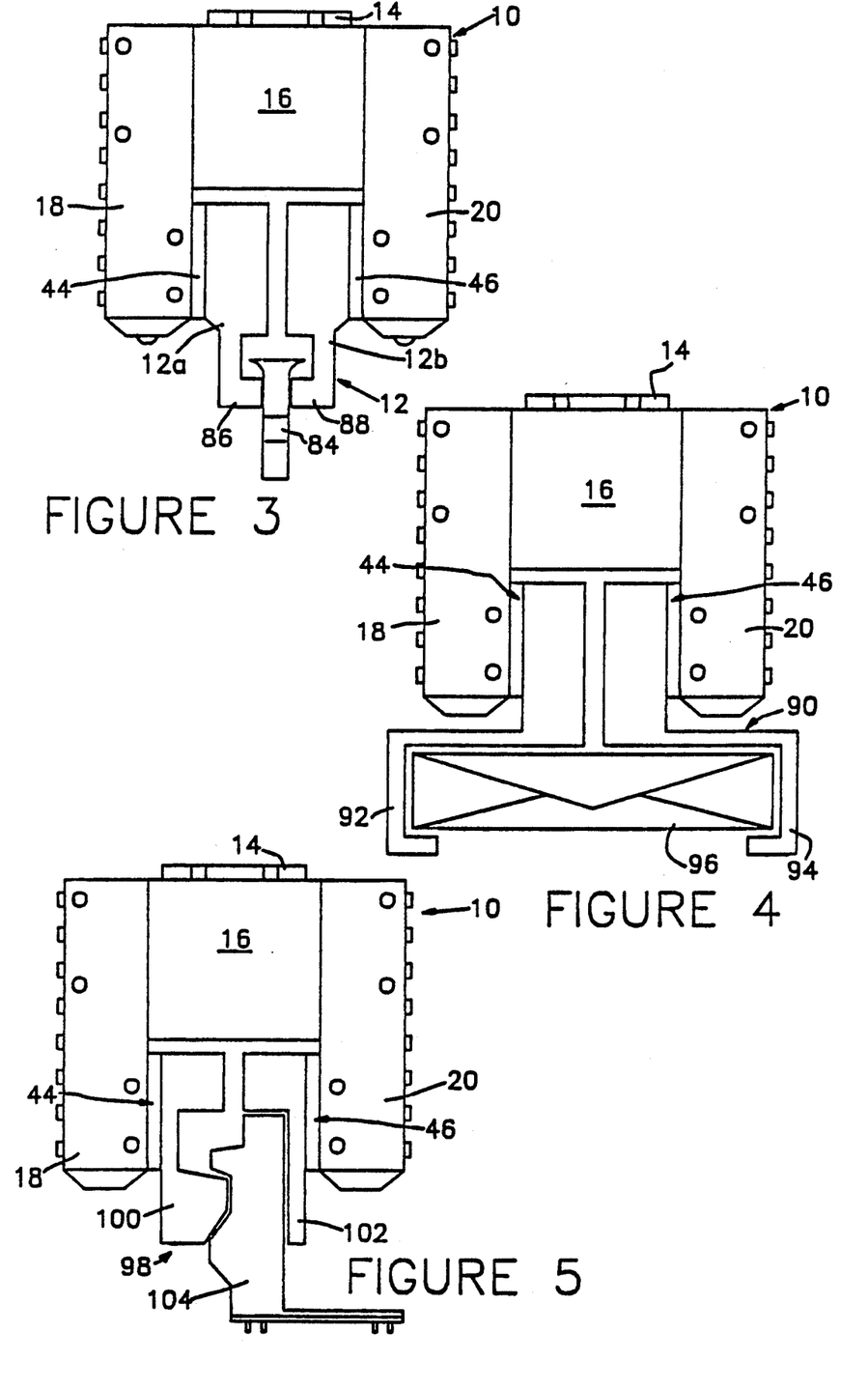
FIG. 3 is a pictorial representation of the front view in elevation of the robotic end effector of FIG. 1 in its closed position engaging a replaceable robotic tool.
FIG. 4 is a front view in elevation of the robotic end effector of FIG. 1 engaging an alternative tool.
FIG. 5 is a front view in elevation of a robotic end effector with a robotic tool having dissimilar members associated therewith.

FIG. 3 shows a front view of the end effector 10 in its closed position where it has acquired an end effector tool 12 that has acquired an object, such as a test tube 84, at the gripping portion 86 and 88 of the fingers 18 and 20, respectively, provided on the end effector 10. By moving the end effector the test tube 84 may be placed in another position and then may be released by moving the end effector fingers 18 and 20 to their open position. The end effector 10 may then be moved to acquire another test tube or object as many times as is necessary or to change tools e.g. 12, 90 and 98 to perform a different function.

FIG. 4 shows an end effector in elevation with the fingers 18 and 20 closed upon an alternative end effector tool 90 with its gripping portion 92 and 94 engaging a much larger object, e.g., such as a package or object that is greater in size than the end effector 10 itself. The mating locking plate portions 44 and 46 provided on tool 94 may be identical to the mating locking plate portions provided on tool 12.

FIG. 5 shows a front view in elevation of an end effector 10 in its closed position having acquired a different type of tool 98 that has non-symmetrical or non-mirror image gripping portions 100 and 102 that are adapted to acquire a non-symmetrical object 104, which may be either larger or smaller than the actual end effector 10 itself. Hereagain, the mating locking plate portions 44 and 46 may be identical to the mating locking plate portions provided for the other end effector tools.

Referring now in particular to FIG. 6, which shows the end effector finger 18 partially in cross-section in its released position suitable to acquire a tool mounted mating locking plate 44 and FIG. 7 which shows the end effector tool 12a having been acquired by the finger 18 in its locked position.

Figure 8:
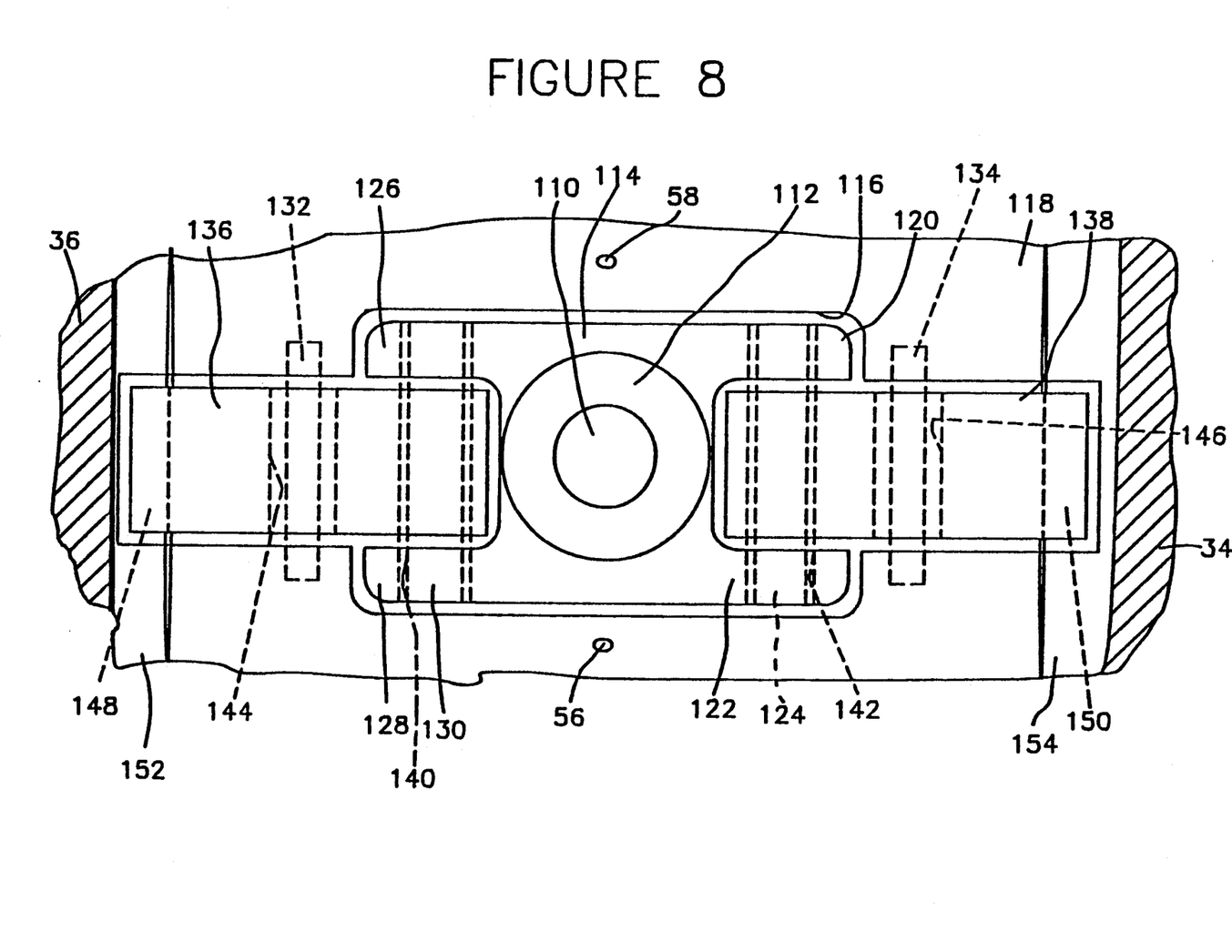
FIG. 8 is a greatly enlarged top plan view of the quick release mechanism, partially broken away, shown in FIG. 7.

The end effector finger 18 includes in its housing 104 proximate its free end, preferably a pneumatic driving apparatus 106, which has a fluid inlet valve 108. The pneumatic driving apparatus 106 may readily be replaced with an electric driving motor or solenoid, not shown, capable of performing the same functions. The centrally disposed output shaft 110 is connected to a collar 112 affixed within a yoke 114 (see FIG. 8), which is generally H-shaped and is adapted to be slidably received into a relatively large elongated through aperture 116 provided in the base plate 118, which is affixed in a conventional manner to the housing 104 of finger 18. The arms 120 and 122 of the yoke 114 are provided with a pivot pin 124 forming a first pivotal axis. The arms 126 and 128 of yoke 114 are also provided with a pivot pin 130 providing a second pivotal axis generally centrally disposed along the arms 126 and 128.

The base plate 118 is provided with a pair of pivot pins 132 and 134 forming a third and fourth pivotal axis.

Elongated translating members 136 and 138 are provided with a first through aperture 140 and 142, respectively, disposed proximate one end thereof and a generally centrally disposed elongated through aperture 144 and 146, respectively, and at the other distal end thereof is provided with a capturing notch 148 and 150, respectively. The capturing notches are adapted to cooperate with and lock onto the protruding portions 152 and 154, respectively, of L-shaped protrusions 34 and 36, respectively, provided on the locking key portions 44 and 46 of the end effector replaceable tools 12, 90 or 98. Apertures 140 and 142 are adapted to receive pivot pins 124, 130, 132 and 134, respectively and elongated apertures 144 and 146 are adapted to receive pivot pins 132 and 134.

Figure 9:
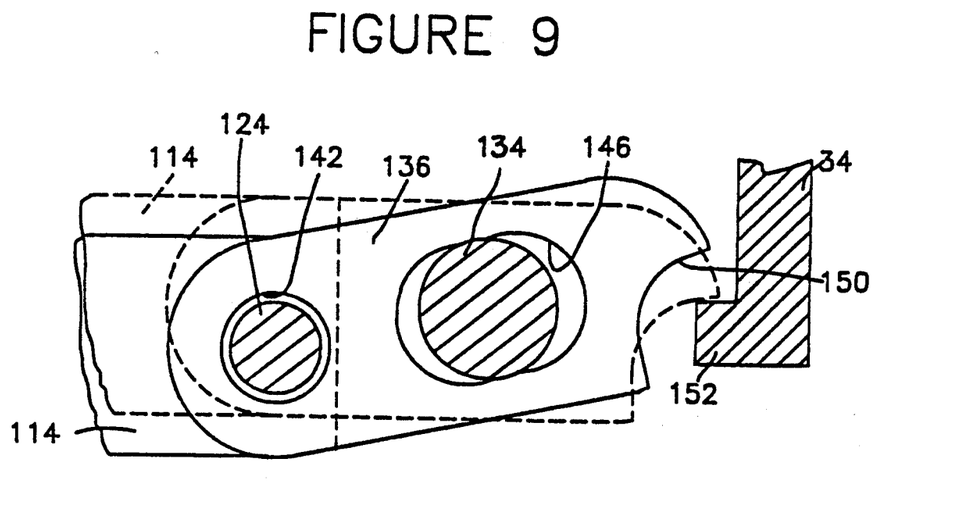
FIG. 9 is a greatly enlarged side view in elevation, partially broken away, showing the translating member in its releasing and locking positions.

The movement of the translating member 136 is clearly shown by referring to FIGS. 6 and 7 and to FIG. 9, which shows the first or releasing position in solid lines and when moved to its second position, shown in the broken lines, the capturing notch 150 is in its locking or expanding position.

Figure 10:
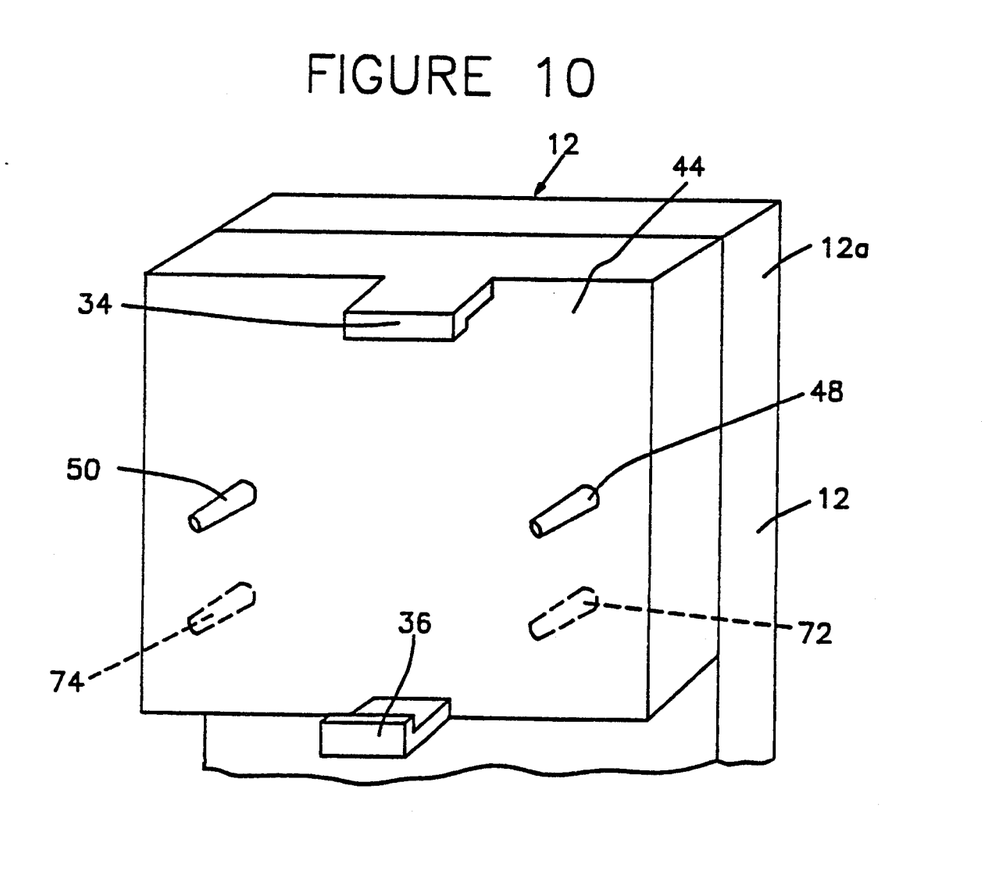
FIG. 10 is a greatly enlarged view of the cooperating protrusions and connections provided on one end of a robotic end effector replaceable tool.

Referring now to FIG. 10 which is a pictorial perspective view of the mating locking adapter plate portion 44 of one half 12a of a replaceable end effector tool 12 and includes the L-shaped protrusions 34 and 36 which help to lock the tool 12 in position and the tapered guide pins 48 and 50, which assist in guiding the end effector tool 12 accurately into position. In addition, in broken lines, can be seen the electrically conductive pins 72 and 74 which are adapted to cooperate with sockets 68 and 70 or 64 and 66, respectively which could provide pneumatic and/or electrical power to an end effector tool, if need be.

Figure 11:
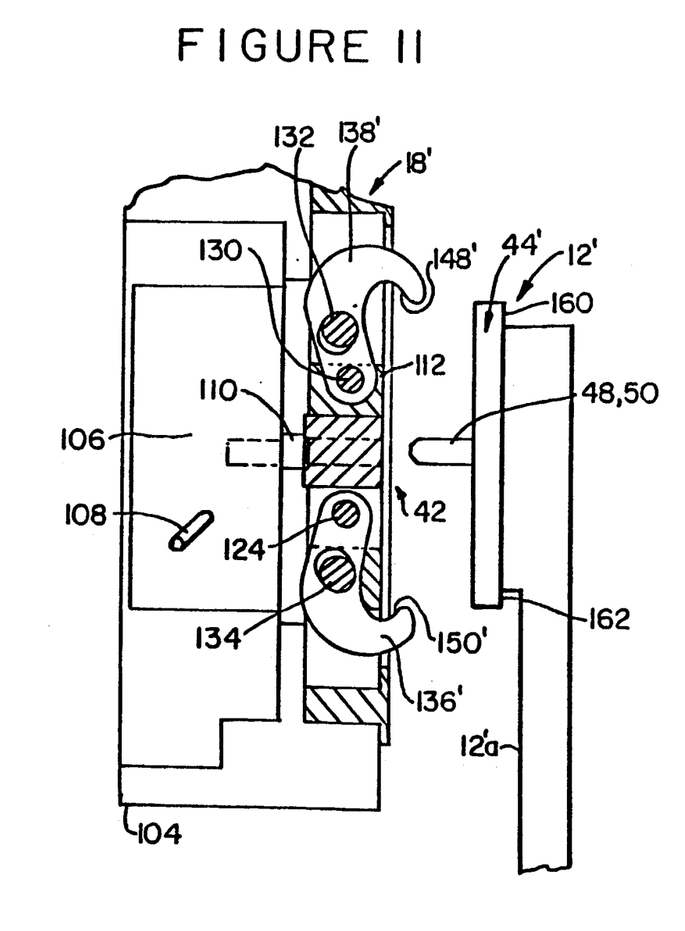
FIG. 11 is an enlarged view of an alternative embodiment in elevation partially broken away with the locking mechanism, in position having locked onto a mating locking plate provided on a replaceable end effector tool.
Figure 12:
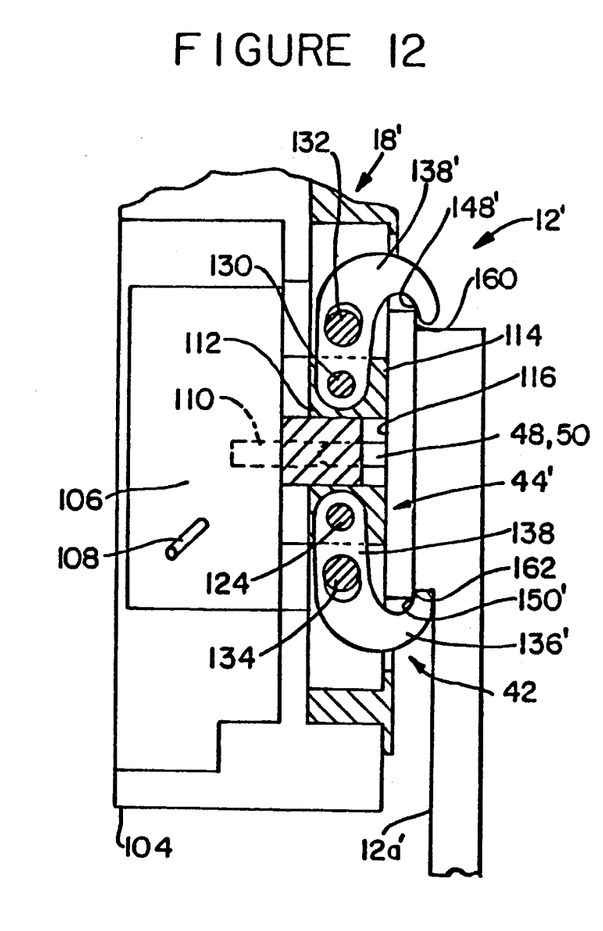
FIG. 12 is the same view shown in FIG. 11 after the locking mechanism has released the tool mating locking plate.

Referring now to FIGS. 11 and 12 there is shown an alternative embodiment of a robotic finger 18' shown in its opened or released position in FIG. 11 and shown in its closed or lock position in FIG. 12. The mating locking adapter plate 44' is provided with an overhanging lip portion 160 and 162 and it is affixed to one portion 12a' of the tool 12', in a conventional manner. The mating locking plate 44' may also be provided with tapered and alignment pins 48 and 50 as well as pins 72 and 74 which may provide an electrically conductive path to the end effector finger 18' in a manner similar to that described for finger 18. The alternative embodiment described in FIGS. 11 and 12 has elongated translating members 136' and 138' of a slightly different shape than that set forth in the first embodiment described. However, the function is essentially the same as described earlier and capturing notches 148' and 150' function in the same manner as notches 148 and 150 in the earlier embodiment and capture the overhanging lip portions 160 and 162, respectively, as the protruding portions 152 and 154 were captured by translating members 136 and 138 of the alternative embodiment. The other items of the assembly are identical and operate in a reverse manner, since in its extended position of shaft 110 the embodiment shown in FIG. 11 is in its open or release mode whereas, in its contracted position as shown in FIG. 12 the locking assembly is in its closed or capture mode.

In operation, a variety of tools are stored within reach of the robot arm and end effector. Each tool or tool set is fitted with a pair of mating locking plate portions 44 or 46 and affixed to the tool 12a and 12b to standardize the tool for a robotic interface. The robot and the end effector are controlled by a cell computer, not shown, to acquire a particular end effector tool nested at a remote location. The computer positions the locking mechanism to its first or release position and moves to the zone where the end effector tool is accurately positioned. The fingers of the robotic end effector 18 and 20 are moved into position to acquire an end effector tool mating 12. Once positioned over the tool locking plate portion 44, the end effector fingers 18 and 20 are moved to their closed position to engage the mating locking plate pins 48 and 50 and accurately guide the adapter plate portion to an exact location. Once the tool is accurately seated within the end effector fingers, the computer energizes the driving mechanism 106 moving the shaft 110 so that the translating members 136 and 138 move to their second or locking position, thereby locking and retaining the end effector tool in a controlled accurate position. Because of the large surface of the mating locking plate, and the fact that the forces supplied by the pneumatic drive motor 106 are against the face of the mating locking plate 44 the surface of the end effector finger is held with great force against the mating locking plate and they are reliably affixed to each other. The locking mechanism applies a primary force on the rear surface of portions 12a and 12b towards the finger so that this force enhances the mating locking plate finger surface engagement. The robotic arm then moves the robotic end effector 10 with its locked tool 12 to acquire an object or perform any designated task.

When tasks are completed with use of a tool, the computer causes the robot to return to the specific tool's nesting location and drive 106 operates to move members 138 to their unlocked position so that protrusions 152 are released. Drive 16 then operates to move fingers away from the nested tool. The robot is then moved to position the end effector to acquire a different tool in the same manner described above.

The apparatus described in the two embodiments of the present invention may be purchased from S. T. Monforte Robotics, Inc., of Trenton, N.J. as Model No. Foreman P1 and P2.

Although the example described herein related primarily to manufacturing production or material handling, it should be understood that the invention has applications in any automatic productions line, service, field or other robotic environment in which robotic flexibility or multifunctionality is desired. Representative applications of the invention include, e.g., multifunction work cells, electronic and mechanical assembly, large and small part handling, custom part handling, gluing, spraying and masking, power tool quick-change, machine loading, hazardous environments and auto manufacturing change over and life support cells for the handicapped.

Hereinbefore has been disclosed a quick release end effector have a finger locking mechanism which is suitable for maintaining the system accuracy and integrity once an end effector tool is captured and the system will not lose its accuracy because of wear. The locking mechanism is capable of readily engaging and disengaging end effector tools by a mechanism placed in the fingers of the robotic end effector, thus making the changing of tools a simple matter. It will be understood that various changes in the detail, materials, arrangements of parts and operating conditions which have been herein described and illustrated in order to explain the nature of the invention may be made by those skilled in the art within the principles and scope of the instant invention.

Having thus set forth the nature of the invention, what is claimed is:

1. A quick release finger locking mechanism for an end effector having a pair of extending fingers and disposed on the distal end of a robotic arm, comprising:
  a) a base plate affixed in each of said fingers, said base plate having;
    i) a relatively large elongated through aperture, said through aperture being provided with a first pivotal axis disposed proximate one end thereof and a second pivotable axis disposed proximate the other end thereof;
  b) an elongated yoke member affixed on one end of a shaft means adapted to be slidably received in said relatively large elongated through aperture, said yoke member being provided with;
    i) a pair of elongated openings, one of said openings being disposed on each end thereof,
    ii) a third and a fourth pivotal axis generally centrally disposed within each of said elongated openings;
  c) a pair of elongated translating means;
    i) said first translating means being provided with, a first transverse through aperture disposed proximate one end thereof adapted to slidably receive said first pivotable axis, a second transverse elongated through aperture generally centrally disposed adapted to slidably receive said third pivotable axis therein and a first capturing notch disposed on the distal portion of the other end thereof,
    ii) said second translating means being provided with, a first transverse through aperture disposed proximate one end thereof adapted to slidably receive said second pivotable axis, a second transverse elongated through aperture generally centrally disposed adapted to slidably receive said fourth pivotable axis therein and a second capturing notch disposed on the distal portion of the other end thereof; and
  d) drive means disposed in each of said fingers coupled to a source of energy and connected to said shaft means, said drive means being adapted to move said shaft means to a first or release position and to move said shaft means to a second or locking position, said energy source being remotely controlled;

wherein when said drive means moves said shaft means to said second position, said translating means moves to permit said capturing notches to engage a cooperating means provided on an end effector replaceable tool, locking it into position.

2. A quick release finger locking mechanism for an end effector disposed on the distal end of a robotic arm, according to claim 1 wherein said elongated yoke member is generally in the form of the letter "H" in a plan view, said third and fourth pivotal axis being disposed between the arms thereof and said shaft means being centrally affixed to the transverse portion thereof.

3. A quick release finger locking mechanism for an end effector disposed on the distal end of a robotic arm, according to claim 1 wherein said drive means is affixed to said base plate.

4. A quick release finger locking mechanism for an end effector disposed on the distal end of a robotic arm, according to claim 1 wherein said drive means is pneumatically activated.

5. A quick release finger locking mechanism for an end effector disposed on the distal end of a robotic arm, according to claim 1 wherein said drive means is electrically activated.

6. A quick release finger locking mechanism suitable for an end effector disposed on the distal end of a robotic arm wherein said end effector has a pair of extending fingers, the improvement which comprises:
   a) a base plate affixed in each of said fingers, said base plate having;
      i) a relatively large elongated through aperture, said through aperture being provided with a first pivotal axis disposed proximate one end thereof and a second pivotable axis disposed proximate the other end thereof;
   b) an elongated yoke member affixed on one end of a shaft means adapted to be slidably received in said relatively large elongated through aperture, said yoke member being provided with;
      i) a pair of elongated openings, one of said openings being disposed on each end thereof,
      ii) a third and a fourth pivotal axis generally centrally disposed within each of said elongated openings;
   c) a pair of elongated translating means;
      i) said first translating means being provided with, a first transverse through aperture disposed proximate one end thereof adapted to slidably receive said first pivotable axis, a second transverse elongated through aperture generally centrally disposed adapted to slidably receive said third pivotable axis therein and a first capturing notch disposed on the distal portion of the other end thereof;
      ii) said second translating means being provided with, a first transverse through aperture disposed proximate one end thereof adapted to slidably receive said second pivotable axis, a second transverse elongated through aperture generally centrally disposed adapted to slidably receive said fourth pivotable axis therein and a second capturing notch disposed on the distal portion of the other end thereof; and
   d) drive means disposed in each of said fingers coupled to a source of energy and connected to said shaft means, said drive means being adapted to move said shaft means to a compressed or locking position and to move said shaft means to an extended or releasing position, said energy source being remotely controlled;
   wherein when said drive means moves said shaft means to said second position, said translating means moves to permit said capturing notches to engage a cooperating means provided on an end effector replaceable tool, locking it into position.

7. A quick release finger locking mechanism for an end effector having a pair of extending fingers and disposed on the distal end of a robotic arm, comprising:
   a) a base plate affixed in each of said fingers, said base plate having;
      i) a relatively large elongated through aperture, said through aperture being provided with a first pivotal axis disposed proximate one end thereof and a second pivotable axis disposed proximate the other end thereof;
   b) an elongated yoke member affixed on one end of a shaft means adapted to be slidably received in said relatively large elongated through aperture, said yoke member being provided with;
      i) a pair of elongated openings, one of said openings being disposed on each end thereof,
      ii) a third and a fourth pivotal axis generally centrally disposed within each of said elongated openings;
   c) a pair of elongated translating means;
      i) said first translating means being provided with, a first transverse through aperture disposed proximate one end thereof adapted to slidably receive said first pivotable axis, a second transverse elongated through aperture generally centrally disposed adapted to slidably receive said third pivotable axis therein and a first capturing notch disposed on the distal portion of the other end thereof; and
      ii) said second translating means being provided with, a first transverse through aperture disposed proximate one end thereof adapted to slidably receive said second pivotable axis, a second transverse elongated through aperture generally centrally disposed adapted to slidably receive said fourth pivotable axis therein and a second capturing notch disposed on the distal portion of the other end thereof; and
   d) drive means disposed in each of said fingers coupled to a source of energy and connected to said shaft means, said drive means being adapted to move said shaft means to a first or locking position and to move said shaft means to a second or releasing position, said energy source being remotely controlled;
   wherein when said drive means moves said shaft means to said first position, said translating means moves to permit said capturing notches to lock a cooperating means provided on an end effector replaceable tool, locking it into position and providing a force directed towards said end effector fingers.

* * * * *